United States Patent
Mordvinov et al.

(10) Patent No.: US 7,596,550 B2
(45) Date of Patent: Sep. 29, 2009

(54) SYSTEM AND METHOD FOR QUERY PLANNING AND EXECUTION

(75) Inventors: Vladimir Mordvinov, Ottawa (CA); Soufiane Azizi, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 11/408,705

(22) Filed: Apr. 21, 2006

(65) Prior Publication Data

US 2006/0294076 A1 Dec. 28, 2006

(30) Foreign Application Priority Data

Jun. 23, 2005 (CA) .................................. 2510630
Sep. 13, 2005 (CA) .................................. 2518902

(51) Int. Cl.
*G06F 17/30* (2006.01)

(52) U.S. Cl. ............................ 707/3; 707/10; 707/100; 707/102

(58) Field of Classification Search ..................... 707/3, 707/10, 100, 102
See application file for complete search history.

(56) References Cited

U.S. PATENT DOCUMENTS

| | | | |
|---|---|---|---|
| 6,356,887 B1 * | 3/2002 | Berenson et al. | 707/4 |
| 6,446,060 B1 * | 9/2002 | Bergman et al. | 707/3 |
| 6,754,652 B2 * | 6/2004 | Bestgen et al. | 707/3 |
| 7,171,400 B2 * | 1/2007 | Koubenski et al. | 707/3 |
| 7,509,311 B2 * | 3/2009 | Galindo-Legaria et al. | 707/3 |
| 2004/0215629 A1 * | 10/2004 | Dettinger et al. | 707/100 |
| 2004/0230666 A1 * | 11/2004 | Taboada et al. | 709/217 |
| 2006/0230016 A1 * | 10/2006 | Cunningham et al. | 707/2 |
| 2006/0282423 A1 * | 12/2006 | Al-Omari et al. | 707/4 |

* cited by examiner

*Primary Examiner*—Charles Rones
*Assistant Examiner*—Rezwanul Mahmood
(74) *Attorney, Agent, or Firm*—Patterson & Sheridan, LLP

(57) ABSTRACT

A coordination planner is suitably used for a query framework system for processing a user request for data from one or more data sources. The query framework system comprises multiple query processing components including a set of query operation providers, each being capable of providing a specific query operation. The coordination planner prepares a user request for execution by translating a logical representation of the user request into a physical representation of the user request using the query operation providers, and executes the physical representation of the user request to obtain a result data stream using the query operation providers.

12 Claims, 9 Drawing Sheets

All Operations
    data source types
    query Blocks
        rowset operations
        join Operation
        detail Filter
        summary Filter
        sorting
        dimensional Operations
            one dimension
            many dimensions
            calculated member
        subquery
        operators
        functions
            relational
            multidimensional
        summary functions
    member reference
    literals

```xml
<allOperations supported="false">
    <dataSourceTypes supported="false">
        <relationalQuery supported="true"/>
        <olapQuery supported="false"/>
        <vendorQuery supported="false"/>
        <providerQuery supported="false"/>
    </dataSourceTypes>
    <queryBlocks supported="true">
        <rowsetOperations supported="true">
            <union supported="true"/>
            <unionAll supported="true"/>
            ...
        </rowsetOperations>
        <joinOperation supported="true"/>
        <detailFilter supported="true"/>
        <summaryFilter supported="false"/>
        <sorting supported="true"/>
        <dimensionalOperations supported="false">
            <oneDimension supported="true"/>
            <manyDimensions supported="false"/>
            <calculatedMember supported="false"/>
        </dimensionalOperations>
    </queryBlocks>
    <operators supported="true">
        <plus supported="true"/>
        <minus supported="true"/>
        ...
    </operators>
    <functions>
        <relational supported="true"/>
        <multidimensional supported="false"/>
        <summaryFunctions supported="true">
            <function name="total" supported="true"/>
            <function name="average" supported="true"/>
            ...
        </summaryFunctions>
    </functions>
    <literals supported="true">
        <nullLiteral supported="true"/>
        <numericLiteral supported="true"/>
        ...
    </literals>
    <memberReference supported="false"/>
</allOperations>
```

Figure 9

```
<allOperations supported="false">
        <dataSourceTypes supported="false">
                <relationalQuery supported="true"/>
        </dataSourceTypes>
        <queryBlocks supported="true">
                <summaryFilter supported="false"/>
                <dimensionalOperations supported="false">
                        <oneDimension supported="true"/>
                </dimensionalInfo>
        </queryBlocks>
        <operators supported="true"/>
        <functions>
                <relational supported="true"/>
                <multidimensional supported="false"/>
                <summaryFunctions supported="true"/>
        </functions>
        <literals supported="true"/>
        <memberReference supported="true"/>
</allOperations>
```

Figure 10

```
<allOperations supported="true">
        <dataSourceTypes supported="false">
                <vendorQuery supported="true"/>
        </dataSourceTypes>
</allOperations>
```

Figure 11

```
<allOperations supported="false">
        <dataSourceTypes supported="false">
                <olapQuery supported="false"/>
        </dataSourceTypes>
        <queryBlocks supported="true">
                <rowsetOperations supported="false"/>
        </queryBlocks>
        <operators supported="true"/>
        <functions supported="false">
                <multidimensional supported="true"/>
                <summaryFunctions supported="true"/>
        </functions>
        <literals supported="true"/>
        <memberReference supported="true"/>
</allOperations>
```

SYSTEM AND METHOD FOR QUERY PLANNING AND EXECUTION

FIELD OF INVENTION

The present invention relates to a system and method for query planning and execution which is suitably used in an open system of loosely coupled query processing components.

BACKGROUND OF THE INVENTION

Many organizations use data stores for storing business data, such as financial data and operational data. In order to assist business users to examine their data, various data analyzing applications are proposed. Those data analyzing applications provide various views or reports of data to users. The data analyzing applications have query engines that access the data stores to obtain desired data. Some data analyzing applications have Online Analytical Processing (OLAP) engines to provide multidimensional views of data.

Those existing query engines and OLAP engines use components of the engines to obtain desired data, and do not allow for external components to be involved into the internal logic of query processing. Thus, these engines cannot reuse or share functionality with other components.

Reuse query operation provider functionality is possible in the architecture supported by Object Linking & Embedding Data Base (OLE DB) interface, where so called "OLEDB service providers" are designated to provide reusable functionality for query result post-processing. Yet the planning logic compiling all query operation provider actions in a single execution plan cannot be shared.

SUMMARY OF THE INVENTION

The present invention uses a coordination planner that divides the query processing into a query preparation phase and a query execution phase.

It is an object of the invention to provide an improved system and method for query planning and execution that are suitably used in an open system of loosely coupled components.

According to the present invention there is provided a query processing coordination planner for coordinating a query processing in a query framework system that processes a user request for data from one or more data sources. The query framework system has multiple query processing components including a set of query operation providers, each being capable of providing a specific query operation, and a query framework interface allowing communication between the multiple query processing components. The query processing coordination planner comprises a request preparation coordinator and a request execution coordinator. The request preparation coordinator is provided for preparing a user request for execution by translating a logical representation of the user request into a physical representation of the user request, using the query operation providers. The request execution coordinator is provided for executing the physical representation of the user request to obtain a result data stream, using the query operation providers.

In accordance with another aspect of the invention, there is provided a query processing coordination planner for coordinating a query processing to obtain requested data from one or more data sources. The query processing coordination planner comprises a request preparation coordinator and a request execution coordinator. The request preparation coordinator is provided for organizing communication between the coordination planner and one or more query operation providers for translating a logical representation of the user request into a physical representation of a user request, and generating an execution plan expressed by the physical representation of a user request, using the query operation providers. The request execution coordinator is provided for executing the physical representation of the user request in accordance with the execution plan using the query operation providers.

In accordance with another aspect of the invention, there is provided a method of processing a user request for data from one or more data sources. The method comprises the steps of receiving a user query; translating a logical representation of the user request into a physical representation of a user request using the query operation providers; generating an execution plan expressed by the physical representation of a user request using the query operation providers; and executing the physical representation of the user request in accordance with the execution plan using the query operation providers.

In accordance with another aspect of the invention, there is provided a memory containing computer executable instructions that can be read and executed by a computer for caring out a method of processing a user request for data from on one or more data sources. The method comprises the steps of receiving a user query; translating a logical representation of the user request into a physical representation of a user request using the query operation providers; generating an execution plan expressed by the physical representation of a user request using the query operation providers; and executing the physical representation of the user request in accordance with the execution plan using the query operation providers.

In accordance with another aspect of the invention, there is provided a propagated signal containing computer executable instructions that can be read and executed by a computer, the computer executable instructions being used to execute a method of processing a user request for data from on one or more data sources. The method comprises the steps of receiving a user query; translating a logical representation of the user request into a physical representation of a user request using the query operation providers; generating an execution plan expressed by the physical representation of a user request using the query operation providers; and executing the physical representation of the user request in accordance with the execution plan using the query operation providers.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 9 is an example of an operation support table;

FIG. 10 is another example of an operation support table;

FIG. 11 is another example of an operation support table;

FIG. 12 is another example of an operation support table;

DETAILED DESCRIPTION

Figure 1:
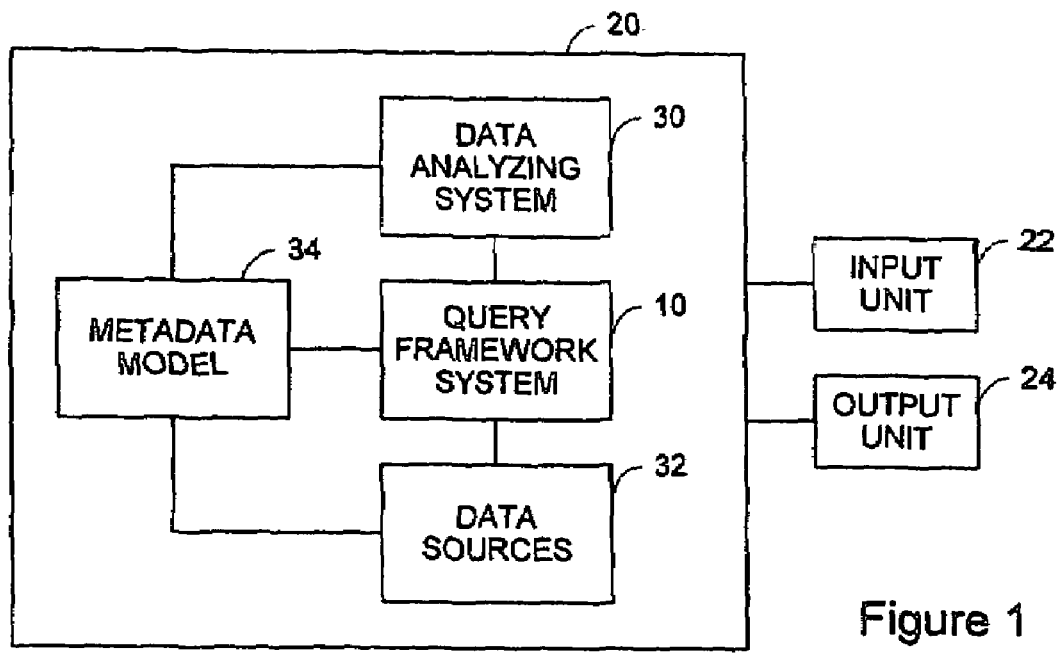
FIG. 1 is a block diagram showing a query framework system in accordance with an embodiment of the present invention.

Referring to FIG. 1, a query framework system 10 in accordance with an embodiment of the application is described. The query framework system 10 is used in a computer system 20 having an input unit 22 and an output unit 24. The query framework system 10 is provided to receive user queries from a data analyzing system 30 and process the received user requests to retrieve requested data from one or more data sources 32.

The query analyzing system 30 is an application that provides various views of data in the data sources 32 to allow users to analyze the data. When a user requests a view of data, the query analyzing system 20 generates a user request. To generate user requests, the query analyzing system 20 may use a metadata model 34 that contains metadata of the data sources 32. The user request is in a query language that the query analyzing system 20 uses to issue the user request. Some query analyzing system 20 may issue a user request in a datasource language, such as SQL, and some query analyzing system 20 may issue a user request in a language specific to the query analyzing system 20.

The query framework system 10 intercepts user requests generated by the data analyzing system 30. It processes and executes the user requests to retrieve desired data from the data sources 32.

Figure 2:
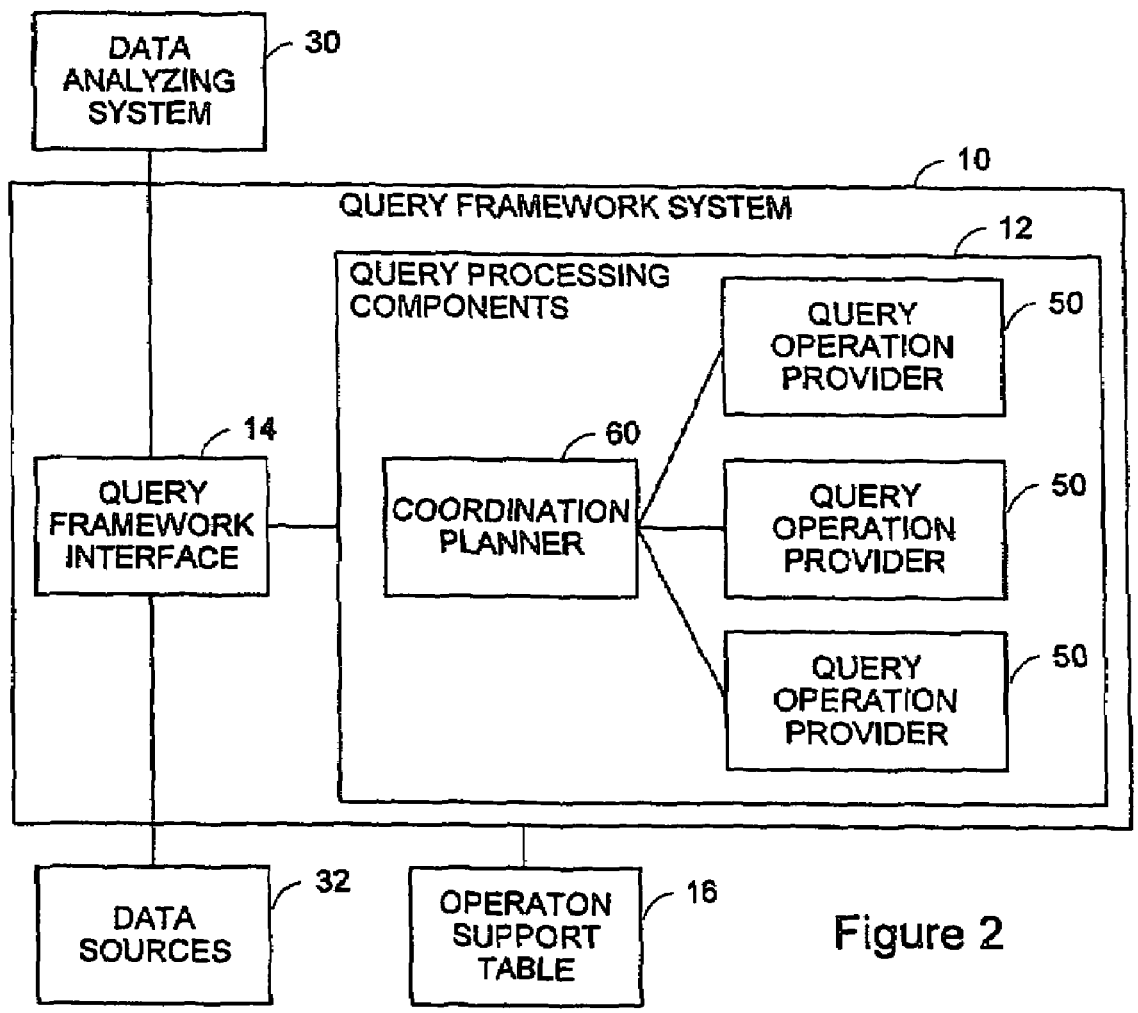
FIG. 2 is a block diagram showing an embodiment of the query framework system.

As shown in FIG. 2, the query framework system 10 has multiple query processing components 12. Query processing components 12 include a set of query operation providers 50 and a coordination planner 60. Query processing components 12 share a common interface 14 and a common query language of the query framework system 10. Query processing components 12 are pluggable, as described below.

Each query operation provider 50 is capable of performing a specific operation on queries, as further exemplified below. In FIG. 2, three query operation providers 50 are shown for the purpose of illustration. There may be more or fewer query operation providers in the query framework system 10.

Figure 6:
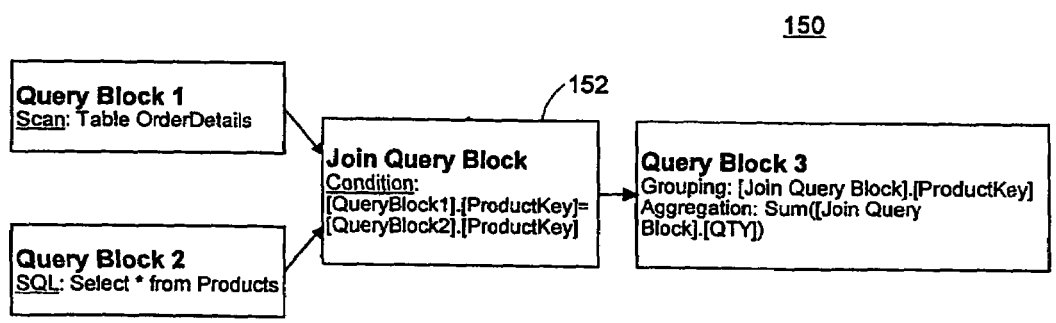
FIG. 6 is a diagram showing an example of a query tree.

The query framework system 10 uses a query framework (QF) query 150 as exemplified in FIG. 6.

A QF query 150 plays the role of a query specification that the query operation providers 50 use to communicate to each other and to the coordination planner 60 within the query framework system 10.

The QF query definition is an extension of the user request specification defined by the data analyzing system 30. This extension is applicable to any query language that can express a whole request conceptually as a tree 150 of query blocks 152 also called here macro operations. The results of child query blocks feed the operation of the parent query block. SQL is the query language of this kind where query blocks are expressed with the SELECT statements. Another example is the Cognos specification of the BIQuery used in the ReportNet™ product. FIG. 6 shows an example of a QF query 150 viewed conceptually as a tree 150 of query blocks 152 or macro query operations.

The following are the extensions that QF query introduces to the user request language.

QF query associates all relevant query blocks with an identifier that is unique within the whole user request and incorporates the identifier into the user request syntax.

Figures 7, 8:
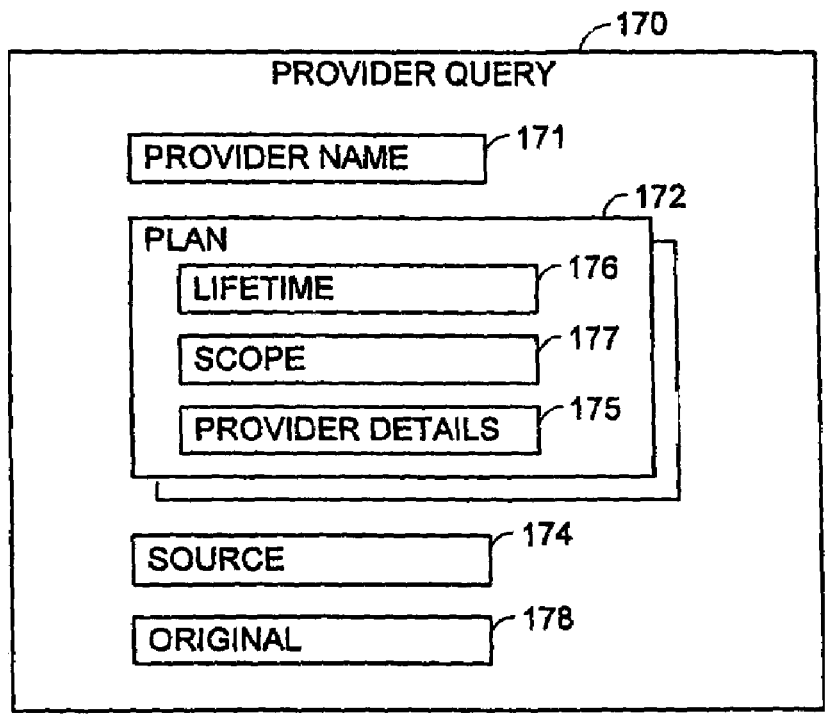
FIG. 7 is a diagram showing an example of a provider query.
FIG. 8 is an example of an operation support table organization.

QF query also extends the user request specification with the concept of the "provider query" 170 as exemplified in FIG. 7. A provider query 170 represents the planned version of a query block, ready for execution by a designated query operation provider 50. The provider query 170 contains information needed for the operation execution by the query operation provider 50 associated with it. The provider query 170 can be inserted into a user request wherever the syntax of the user request specification allows for the syntax construct expressing a query block. In the case of SQL, the provider query 170 can be specified in place of the SELECT block. Different syntax to express a provider query 170 can be chosen, as long is it is compatible with the syntax rules of the main user request specification.

A provider query 170 can be viewed as a physical representation of a query block operation, as opposed to the logical representation of a query block operation that is expressed with user request language. Replacing logical representation of the user request query blocks with the physical representation expressed with provider queries contributes to various advantages of the query preparation process in the Query Framework system 10. The QF query that consists only of provider queries is ready for the execution phase and called the "execution plan". QF query in the intermediate stages of the query planning process contains a combination of logically expressed query blocks and provider queries.

FIG. 7 shows an example of the structure of a provider query 170. A provider query 170 has a provider name 171 that defines its association with a query operation provider 50 responsible for its execution. The provider query 170 has zero, one or more plans 172 capturing the execution instructions of the given query block and applicability of these instructions. The provider query 170 also has an optional "source" section 174 referencing children query blocks, and an optional "original" section 178 that keeps the logical expression of the provider query operation, i.e., the expression in the user request specification. Provider queries having no plans contain the "original" section, which is the signature used when actual planning is deferred until the execution phase.

The plan 172 contains the execution instructions of the given query block and applicability scope of these instructions. It can also contain any information that query operation provider chooses to preserve between planning and execution phases. The plan 172 is stateless in the sense that it allows the same provider query 170 to be executed multiple times. A plan 172 has a "provider details" section 175, "lifetime" section 176 and a "scope" section 177. The "provider details" section 175 of a plan 172 is the placeholder for provider specific information regarding the plan 172 that primarily is needed to capture the query block execution instruction understood by associated query operation provider. The "lifetime" section 176 indicates how long this plan 172 can be used. The main two types of the lifetime 176 are: "request lifetime" and "unlimited lifetime". The plan 172 may contain pointers to the resources allocated by a query operation provider during planning to be reused at the execution phase, in which case the plan 172 has only "request lifetime". The "scope" section 177 defines the applicability of the plan 172 in the context of actual values of parameters involved in the user request, as some providers are able to generate plans applicable to any actual parameters values, and some providers are only able to generate a plan for given actual parameter values.

QF query may be converted into its tree representation before query processing begins in order to avoid parsing QF query syntax by every component. If QF query extends a user request specification that does not require parsing and has a format that is easy to manipulate, then this step is not needed at all. In the tree representation, each query block is represented by a node of the tree. The semantics of the query blocks can also be expressed as a tree of nodes. Whether the actual conversion of the tree representation is conducted or not, the semantics of QF query can be considered in terms of the tree of query blocks or macro operations, where an operation of every query block is also represented as a subordinate tree of inner-block operations.

The query framework system 10 uses an operation support table 16, as shown in FIG. 2.

The operation support table 16 is associated with every relevant query operation provider. It defines which operations from a predefined set are supported by a given provider. Operations are recognizable patterns in a tree of query blocks or in a tree of a query block specification. Operations are associated with a given node of a corresponding tree and searched for in the context of this node. An operation support table service 81 (FIG. 3) of the coordination planner 60 defines these patterns and provides the logic of spotting them in a query block tree and reporting "supported/unsupported" association of an operation with each provider.

Figure 5:
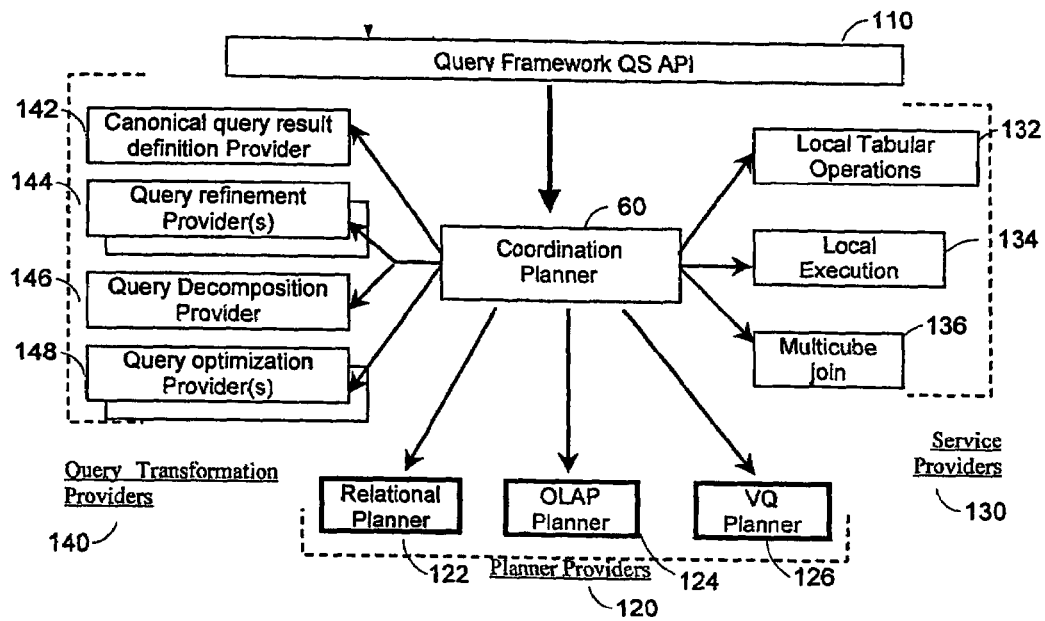
FIG. 5 is a diagram showing an example of a query framework system.

Using this information the coordination planner 60 and other providers, mostly optimization and decomposition transformation providers 148 (FIG. 5), are able to predict whether a certain operation is accepted by a certain provider. The coordination planner 60 uses this information in order to extract a request part supported by a provider that is to be invoked in the query processing sequence. Optimization transformation planners 148 determine the relevance of a given transformation by checking whether the result of the transformation is accepted by a corresponding planner provider 120 (FIG. 5).

The operation support table 16 has a hierarchical organization. An example of the organization of the operation support table 16 is shown in FIG. 8. Settings of the parent node are used by default for all its children, which allows to reduce significantly the amount of information in this table 16. The operation support table 16 may be presented in the XML format. FIG. 9 shows an example of the operation support table 16 for a relational planner provider 122 (FIG. 5). The elements shown in fine letters may be implied by the definition of their parents when the value on the right to "supported" is what is shown on FIG. 9. In that case, these elements are unnecessary in the operation support table 16. If the value is changed to "true" where it was "false" and visa versa, then this element cannot be implied and has to be explicitly defined as part of operation support table 16. FIG. 10 shows an example of a compact form of the operation support table 16 for relational planner provider 122. FIG. 11 shows an example of the operation support table 16 for vendor query planner provider 126 (FIG. 5), designed to handle a variety of different datasources hence it is not able to reject any operation ahead of time. FIG. 12 shows an example of the operation support table 16 for the OLAP planner provider 120.

The query framework system 10 uses query coordination protocol.

Query coordination protocol defines the set of methods with specified input and output parameters that are implemented by every query framework provider participating in user request processing. The methods that each participating provider supports specifically for the described method of query processing are the "prepare" and "execute" methods.

The "prepare" method gets a QF query as an input parameter. As a result of the prepare method, a provider returns a modified version of the input QF query or empty result that indicates that the QF query is not modified. If the QF query was modified, the identifier of the topmost query block in the input QF query matches an identifier of one of the topmost query blocks in the output QF query. The output QF query can contain transformed version of the input QF query expressed in the logical terms of the user request specification. The output QF query can also contain a provider query. The returned query expressed in the logical terms of the user request specification means that a query was transformed into its appropriate equivalent. When a provider returns a provider query for the result of preparation, it means that the query blocks passed to the provider prepare method have been replaced with their physical operation equivalent and have been assigned to the given provider. The combination of logical blocks with provider queries in the response of the prepare method means that the provider has taken responsibility only for a part of the macro operations that are replaced with a provider query. The macro operations that are outstanding and not handled are left to be expressed with logical blocks and passed to other providers in the query framework system 10.

The "execute" method accepts a QF query and zero or more input data streams. The input QF query contains a provider query associated with the provider of the execute method. The names of the input data streams matches the identifiers of children query blocks saved in the "source" section 174 (FIG. 7) of this provider query.

The execute method returns one or more data streams with the names matching identifiers of the provider queries comprising the input QF query.

Optionally, providers can support a "discover" method. The discover method returns an operation support table to be associated with a given provider. If the discover method is not supported by the provider, a default operation support table is assigned by the query framework system 10 to this provider. The default operation support table for a provider can be stored as part of the system configuration. If no operation support information is available, a provider is assumed to support all operations.

Figure 3:
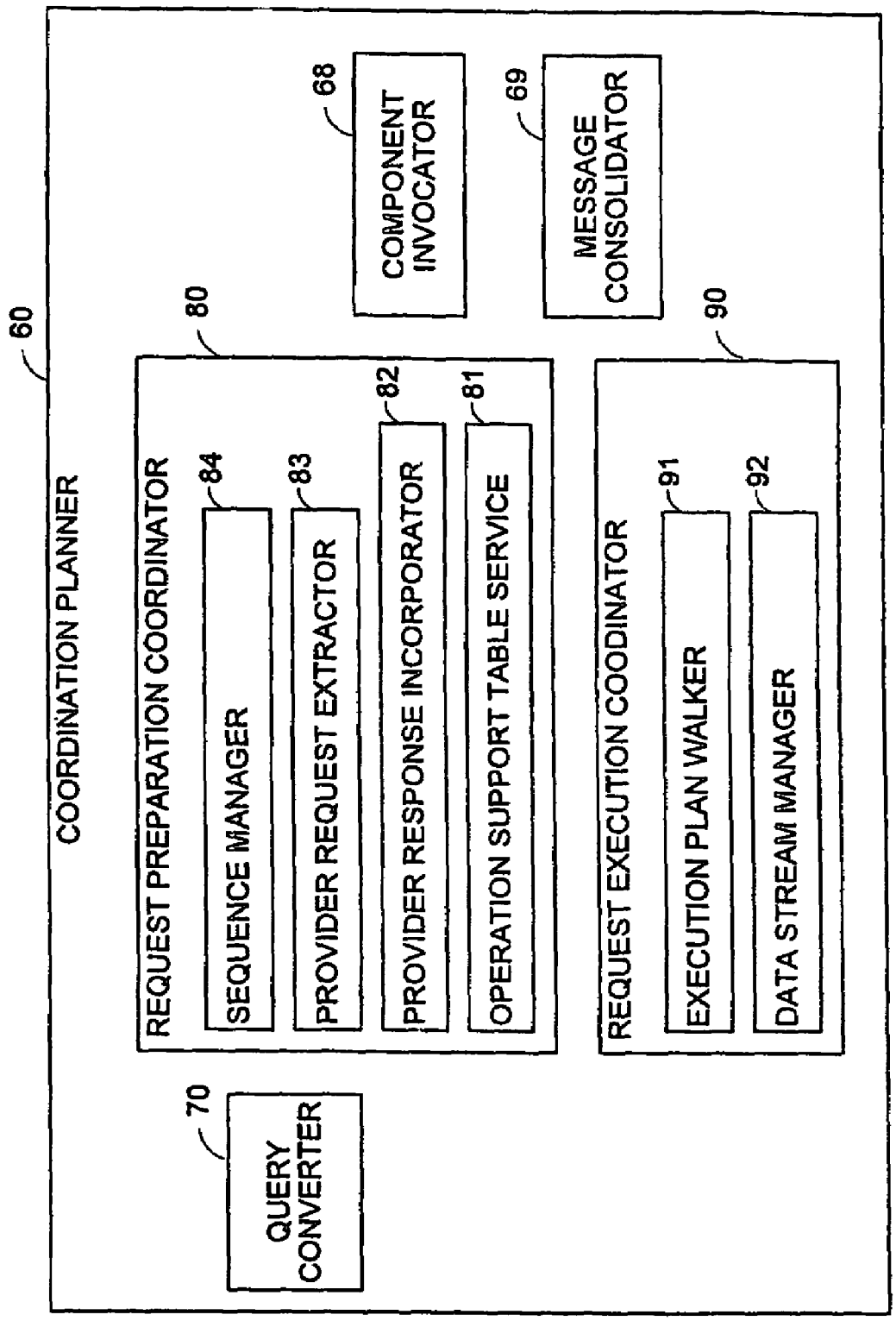
FIG. 3 is a block diagram showing a coordination planner in accordance with an embodiment of the present invention.

The coordination planner 60 is now further described in details referring to FIGS. 2 and 3.

The coordination planner 60 is a component in the query framework system 10 that governs query processing in the system 10 involving multiple query operation providers 50. It shares the same interface 14 with other providers. The coordination planner 60 honors the same query coordination protocol when acting as a query operation provider invoked by an external component for the functionality used for recursive query processing.

The coordination planner 60 divides the query processing into two phases: query planning or preparation phase and a query execution phase. During the query preparation phase, the coordination planner 60 interacts with query operation providers 50 in order to identify and plan the operations associated with each provider, and to determine the sequence of these operations expressed in an execution plan. The coordination planner 60 may use one or more query operation providers 50 during the query preparation phase. During the query execution phase, the coordination planner 60 distributes the query operations to associated query operation providers 50, invoking the query operation providers 50 in accordance with the sequence expressed by the execution plan determined at the preparation phase.

Throughout the preparation phase and execution phase, the coordination planner 60 organizes interaction between the query processing components 12. The interaction is carried out through the common interface 14 and based on the common query language, QF query. Before the preparation phase, the coordination planner 60 converts a user request received from the data analyzing system 30 into a converted query or a query framework (QF) query if the conversion is needed.

FIG. 3 shows the coordination planner 60 in accordance with an embodiment of the invention. The coordination planner 60 has a query converter 70, a request preparation coordinator 80, a request execution coordinator 90, a component invocator 68 and a message consolidator 69. The request preparation coordinator 80 and the request execution coordinator 90 are responsible for the two main stages of a query processing: preparation and execution. The component invocator 68 and a message consolidator 69 are subcomponents of the coordination planner 60 that are used for both stages.

The query converter 70 is the component that first gets the request passed to the coordination planner 60. It converts a user request into a QF query if the conversion is needed before the request starts being planned and executed. It then passes the request to the request preparation coordinator 80.

The request preparation coordinator 80 has an operation support table service 81, provider response incorporator 82, a provider request extractor 83 and a sequence manager 84. The request execution coordinator 90 has an execution plan walker 91 and a data stream manager 92.

The operation support table service 81 of the request preparation coordinator 80 manages services relating to an operation support table 16 (FIG. 2), as described above.

The request preparation coordinator 80 organizes the communication between the coordination planner 60 and query framework components participating in the request preparation stage. These components are invoked in the sequence that is handled by the sequence manager 84. The purpose of the sequence manager 84 is to invoke providers 50 participating in the planning stage in the sequence that is predefined in the configuration of the query framework system 10. The sequence manager 84 calls the provider request extractor 83 to extract the part of QF query to be sent to the next provider in the sequence for preparation. If the provider request extractor 83 returns empty QF query part for a given provider, then this provider is not involved in the processing of this QF query and is skipped by the sequence manager 84. The extracted QF query part then is sent by the sequence manager 84 to the component invocator 68, which adjusts the extracted QF query part to appear as a complete QF query and calls the prepare method of the designated provider passing the extracted QF query. The result of the prepare method returned by the called provider is passed to the provider response incorporator 82 that incorporates the planned version of the extracted QF query part back into the full QF query.

The provider request extractor 83 extracts the part of QF query to be sent to a given provider. It traverses the tree 150 of the QF query blocks 152 (FIG. 6) and identifies query block sub-trees that are completely supported by the given provider. It interacts with the operation support table service 81 in order to determine whether a query block 152 of a QF query is supported by the provider. The supported query block sub-trees comprise the extracted QF query part. The extracted part is replaced in the full QF query with a query operation stub to mark the location of the extracted part.

The provider response incorporator 82 incorporates the planned QF query part received from the provider back into the full QF query as a result of the provider request preparation. It analyses planned QF query received from a provider and compares the identifiers of the outmost query blocks with the names of the query operation stubs in the full QF query, replacing the stubs with the corresponding planned QF query parts.

The request execution coordinator 90 is responsible for the execution phase of the query processing. It gets the planned QF query from the request preparation coordinator 80. The planned QF query is expressed as a tree of planned query blocks denoted as provider queries 170 associated with a certain provider in the query framework system 10. The tree of the planned query blocks is considered as the request execution plan. The execution plan walker 91 traverses the execution plan from leaf nodes up to the root. It uses the component invocator 68 in order to call the execution method of a provider associated with a given planned query block. The result of a query block execution is a stream of data. The result data streams of children query blocks are passed for execution of the parent query blocks by the data stream manager 69, which also handles the lifecycle of the objects representing these data streams.

The message consolidator 69 is invoked whenever providers return error, warning, and/or informational messages. The message consolidator 69 collects them and extends with the name of the provider that produced the message. When more than one error message is collected the coordination planner generates a collective error message.

Figure 4:
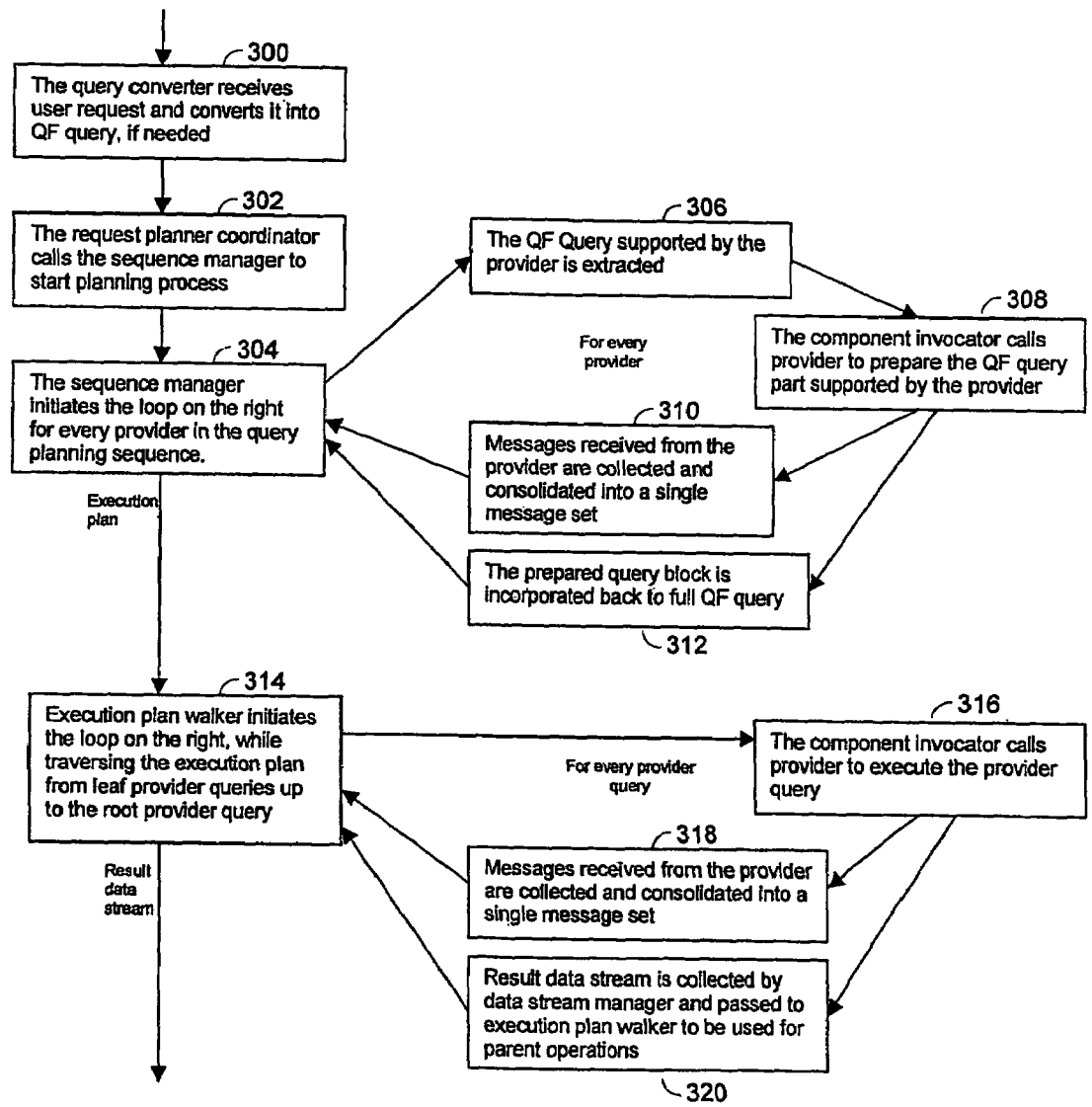
FIG. 4 is a flowchart showing operation of the coordination planner 60.

FIG. 4 shows the sequence of query planning and query execution actions. The query converter 70 receives a user request and converts it into QF query, if needed (300). The request planner coordinator 80 calls the sequence manager 84 to start planning process. The sequence manager 84 initiates the loop 306-312 for every provider in the query planning sequence (304).

In the loop, for every provider, the QF query supported by the provider is extracted (306). The component invocator 68 calls the provider to prepare the QF query part supported by the provider (308). Messages received from the provider are collected and consolidated into a single message set (310). The prepared query block is incorporated back to a full QF query (312).

The execution plan from step 304 is fed to the execution plan walker 91. The execution plan walker 91 initiates the loop 316-320, while traversing the execution plan from leaf provider queries up to the root provider query to generate a result data stream (314).

In the loop, for every provider query, the component invocator 68 calls the relevant provider to execute the provider query (316). Messages received from the provider are collected and consolidated into a single message set (318). The result data stream is collected by the data stream manager 92 and passed to the execution plan walker 91 to be used for parent operations (320).

The query operation providers 50 may be categorized by the role they play in the query framework system 100 as well as by their behavior in the system 10.

FIG. 5 shows an example of the query framework system 10 having three types of query operation providers 50: planner providers 120, service providers 130 and query transformation providers 140.

These provider types are now further described. From the view point of the query framework system 10, the providers 120-140 behave similarly. At the provider initialization stage (the discover command), the providers report the set of supported/unsupported operations. At the planning phase, the providers accept a QF query and transform it into another QF query. For majority of the cases the returned QF query is represented by a single provider query 170. At the execution phase, those providers that support physical operations consume a provider query plus, wherever appropriate, pointers to the objects representing incoming streams and return a data stream representing a result of the operation.

The providers are categorized by their ability to support a provider query at execution phase and to accept incoming data streams, as shown in FIG. 5.

Query planner providers 120 replace the received user request with a provider query that has no children query blocks and hence do not need input data streams during the execution phase. In other words, planner providers 120 support execution of a provider query but do not accept incoming data streams. Normally query planner providers 120 are components that provide access to data either through internal operations or by calling external components providing data. The operation of query planner providers 120 typically involves translation of the user request language into the query language of underling data sources 32, such as SQL. The main part of the operation support tables 62 of planner providers 120 is the data source type associated with them. In this example, the query framework system 10 has relational planner provider 122, OLAP planner provider 124, and vendor query (VQ) planner provider 126. In a different embodiment, the query framework system 10 may have a different set of query planner providers.

Query transformation providers 140 are responsible for preprocessing of a QF query for the consumption of the transformed query by other query operation providers. Query transformation providers 140 transform the QF query in order to make it simpler or supported by other components in the query framework system 10. Pure query transformation providers 140 do not support a provider query as they participate only at the query preparation phase. In this example, the query framework system 10 has a canonical query result definition provider 142, query refinement provider 144, query decomposition provider 146 and query optimization provider 148. In a different embodiment, the query framework system 10 may have a different set of query transformation providers.

The operation support table 16 of the query transformation providers 140 often declares all operations as supported so that all queries are analyzed by the transformation provider as to the applicability of its transformations. In this case the operation support table is expressed such as <allOperations supported="true"/>.

Service providers 130 provide local query operations. Service providers 130 generate provider queries on top of query blocks associated with other components. Service providers 130 support a provider query and accept incoming data streams. These components 130 are responsible for post-processing of data returned by query planners. This category of providers can be replaced, newly added or extracted out the system 10 with minimum disruption to the system 10. In this example, the query framework system 10 has a local tabular operation provider 132, local execution provider 134 and a multicube join provider 136. In a different embodiment, the query framework system 10 may have a different set of query service providers.

The operation support tables 16 of the service providers 130 also often declare all operations as supported. Some service providers, though, may be designated to handle very specific operation pattern in which case this pattern is part of the provider operation support table. The service providers 130 can be invoked after planner providers 120 took a shot on the query. The responsibility of the service providers 130 is to analyze the outstanding unplanned query blocks and recognize those that can be handled by the service providers 130. The query blocks handled by a given service provider are replaced with the provider query associated with this provider. Another option is to invoke certain service providers before planner providers 120. In this case, the service providers have to know ahead of time the type of operations unsupported by planner providers 120, intercept those operations and return a combination of a provider query on top of a transformed logical query block(s) that is (are) further sent to planner providers 120. The provider query in this case defines the local post-processing operation to be applied to the result of the transformed QF query part.

Exposing planning and execution operations with the provider interface 14 (FIG. 2) enables the pluggable architecture with the ability to override implementation of any operation at any stage. Plugging in a new planner provider 120 is a way to introduce an access to new data sources. Service providers 130 may add some post-processing operations to the execution stack. Query transformation providers 140 may be added to enhance, for example, the set of optimization transformations.

Generation of a provider query 170 may require a provider to allocate certain resources that should be preserved between the query preparation and execution phases. The coordination planner 60 allows some resources shared across providers. Those resources are freed when no longer needed. A resource pool is created and owned by the coordination planner 60 for this purpose. It is made accessible for components to add and read instances of the resources. The resource pool is destroyed by the coordination planner 60 once the input request is completely processed. Resources are classified into types. A resource type denotes the semantics of a resource items and also is associated with the interface class used to access the content of a resource item. Some resource item types can be predefined in a query processing system for resources needed by every provider. Other types are specific for a given provider and are dynamically generated. References to resource items can be saved as part of a provider query. Some resource item types can be known ahead of time to have only one item associated with them. Accessing an item of such type can be done only by the type identifier.

The performance of the preparation phase defines the cost of the query coordination process as it is this phase that is strictly needed for the system to be open in terms of the ability to adopt plug-in providers impacting query processing logic transparently for the rest of query processing system components.

There are two methods to improve the performance of the preparation phase. The first method for planner providers is to defer the actual planning until the execution phase. Provider queries generated in accordance with this method have no plans 172 in them and mostly rely on the information in the "original" section 178. The fact of generation of a provider query 170 here indicates to the coordination planner 60 that a given provider has accepted the responsibility of the query portion sent to the provider. This method works well for requests or request portions that are executed only once as actual planning process is done during the execute phase. This style of provider query generation can also be used for initial adoption of the query coordination protocol by providers newly introduced into the query framework system 10.

The second method is to reuse, at the execution phase, the resources needed to prepare a query by storing identifiers of these resource items in the plan section 172 of the provider query 170. For example, in the case of the relational planner 122, this optimization method allows to create a SQL request, prepare it, and keep the instance of the SQL request open so that it may be used at the execution phase.

The sequence of provider invocation is now discussed. Given the task of the pluggable architecture, as described above, the providers 120-140 share the same interface 14 and from that point of view appear the same to the coordination planner 60. In order to make the query framework system 10 work in a predictable fashion, these providers 120-140 are invoked in a certain sequence. Moreover, as a result planning activities, one provider may introduce new elements into QF query, which may need invocation of another provider. The mechanisms used to define sequences of provider invocation are different for planning and execution stages. The sequence of provider invocation during the preparation phase is predefined in the configuration of the query framework system 10. During the execution phase, providers are invoked in accordance with an execution plan tree of provider queries starting with the providers associated with leaf nodes and ending with the provider associated with the root node.

The query planning sequence is defined by a query framework system administrator who coordinates the functionality assigned to query operation providers. Normally, the query preparation sequence starts with query transformation providers, followed by service providers intercepting the query operations for which they are responsible, and ends with query planning providers. The coordination planner 60 invokes every participating provider in the sequence skipping those that according to their operation support tables do not support given request. Providers are allowed to invoke other providers during their query preparation. Some providers engage into recursive preparation process by calling the prepare method of the coordination planner 60 with the request part that requires earlier preparation.

The query execution sequence, i.e., the execution plan, is built as a result of the query planning. Leaf nodes in the execution plan are normally associated with planner providers delivering data from external datasources. The non-leaf nodes represent post-processing or locally executed operations.

The principles of configuring the query framework system 100 are now described.

The coordination planner 60 interacts with the providers 120-140 in the trusting manner, considering that result of a provider activity is valid, and a provider registered in the query framework system 10 has correct properties, e.g., correct position in the query processing sequence and assigned operation support table. In other words, all provider actions are assumed to be correct and fit accurately into the query framework system 10 and the coordination planner 60 does not compensate for incorrect behavior.

The operation distribution process by the coordination planner 60 takes an iterative approach, but also allows for a recursive approach. Any specific provider may be able to invoke other providers to handle its internal operations. Also, response of the prepare command may involve logical query blocks not only at the top levels but also as subqueries of a provider query for which it is responsible. The child queries are passed to the appropriate providers, which is equivalent to the recursive approach. The maximum number of allowed recursions and iterations is a configuration option of the query framework system 10 and it is the method the query framework system 10 protects query processing from endless looping. It is desirable that the system 10 is built in a way to ensure the maximum is never reached for all supported requests. It means that the number of iterations/recursions is not dependant from the complexity of a query in terms of the number and depth of query/expression operations.

The query framework system configuration that can be used to provide the most efficient reuse of functionality implemented in query operation providers is now considered. It is also considered here how to ensure the completeness of the query framework system 10, or in other words which set of query operation providers is to be used in order to make sure that any operation of the user request specification is mapped to the responsibility of a certain provider.

Figure 13:
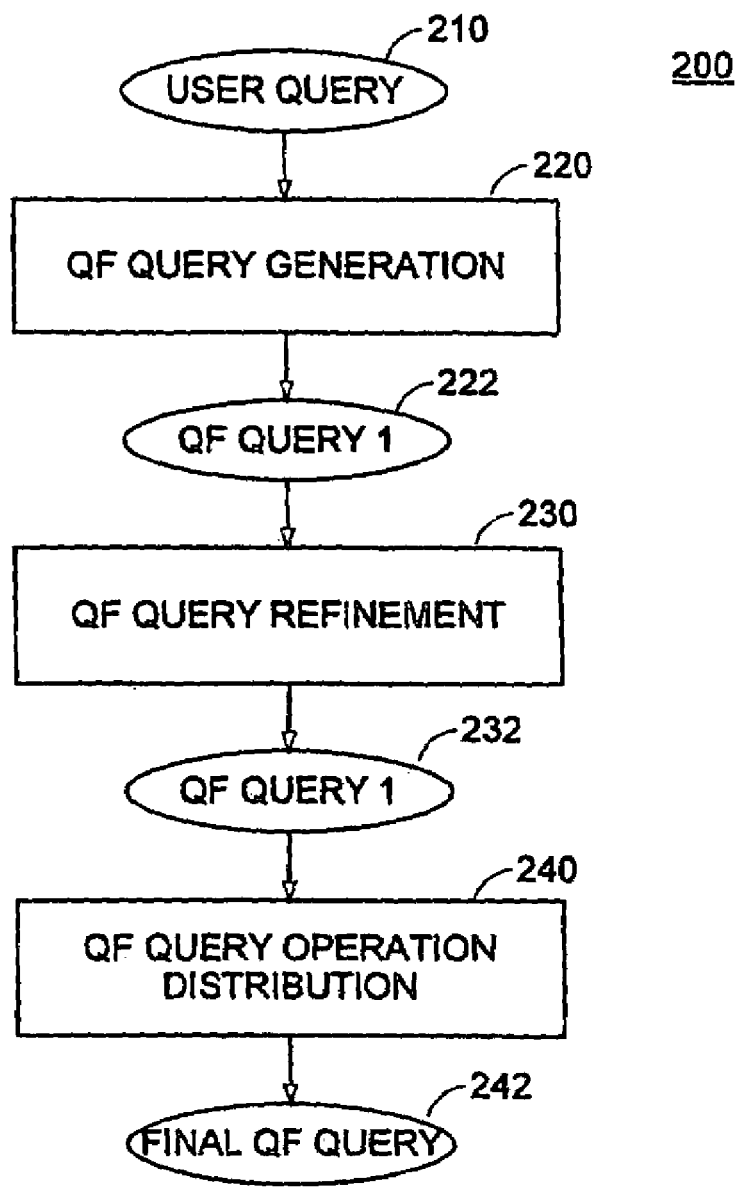
FIG. 13 is a diagram showing an example of a query preparation phase.

Referring now to FIG. 13, an example of the query planning phase carried out by the coordination planner 60 in conjunction with query operation providers is further described in details. FIG. 13 represents the main stages of the query planning process 200. The query planning process is carried out to dispatch or distribute a QF query or its parts across planner and service providers 120, 130, to perform the planning steps needed to facilitate the dispatch/distributions, and to do the query processing steps shared across the providers 120, 130 in order to avoid re-implementing the same activity multiple times and also to insure consistent interpretation of query concepts shared across providers.

As shown in FIG. 13, the query planning process 200 includes QF query generation stage 220, query refinement stage 230 and distribution of operations stage 240.

The coordination planner 60 receives an incoming user request 210. In the QF Query generation stage 220, the incoming user request 210 is converted into an initial version of QF Query 222 whenever the conversion is needed. It can be implemented by a designated provider or this responsibility can be assigned to the coordination planner 60.

The goal of the QF Query refinement stage 230 is to enhance the specification of the QF query to facilitate planning activities implemented in planner providers 120. Given the nature of the activity, it is assigned to one of more transformation providers 140. The coordination planner 60 may take two approaches. The first approach uses a single query refinement provider 144. This approach is simpler but less flexible. The second approach is complex but more flexible. It involves a set of query transformation providers each of which is responsible for a specific query refinement transformation including, but not limited to, join resolution provider, calculations and filters provider, and object access verification provider.

The result of the QF Query refinement stage 230 is an intermediate QF Query 232.

The next stage is the operation distribution stage 240. This stage is implemented in the collaboration of the coordination planner 60 with the planner providers 120, decomposition and optimization transformation providers 146, 148, and service providers 130.

Figure 14:
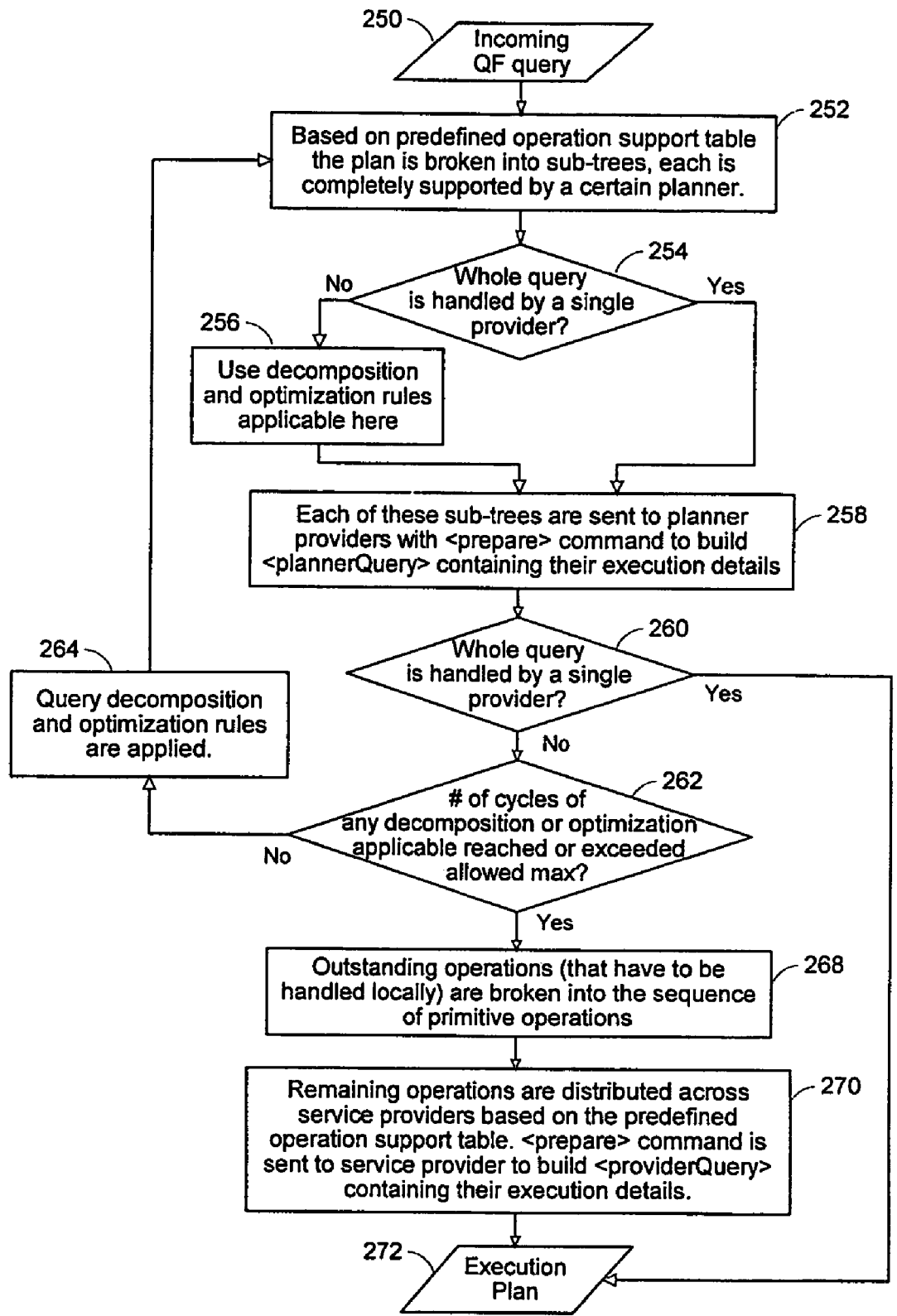
FIG. 14 is a flowchart showing an example of a query operation distribution stage.

The operation distribution stage 240 begins once all query providers responsible for QF query refinement have been called. As shown in FIG. 14, the coordination planner 60 receives the intermediate QF Query 232 (250), and identifies query block sub-trees completely supported by a certain planner provider (252).

After refinement the information is available regarding datasources spanned by a QF query. The whole QF query is pushed to a single planner provider if the planner provider accepts all operations involved in it.

The coordination planner 60 determines if the whole query is handled by a single provider (254). If it is not handled, the coordination planner 60 proceeds with the sequence of decomposition and optimization providers 146, 148 in order to use decomposition and optimization rules applicable to the QF query (256). This decomposition and optimization allows to optimize the query before sending to planner providers 120, based on the knowledge available in the operation support table 62.

The decomposition providers break one query block into a series of two or more query blocks so that some of the result query blocks are accepted by the planner providers.

The role of optimization providers is to perform transformation known to improve query efficiency for any data source and hence should be shared across all planner providers.

The special provider of the decomposition into primitive operations can be present in the query framework system 10 in order to insure its completeness given the system 10 also has service providers associated with every primitive operation. The primitive operation denotes a simplest operation that constitutes a complete query block. The examples of primitive macro operations that can be recognized in the SQL query language are: filter operation, grouping and aggregation operation, sorting operation, joining operation, etc.

Plugging-in new components is now further described.

As described above, query framework system 10 supports pluggable components 12. The system 10 is flexible to allow adding or replacing components participating in the query processing. New components are able to take advantage of the existing functionality without reworking other components.

In general, there are two ways to affect the query execution in the query framework system 10: by query transformation and explicit plug-in operation specification. Query transformation introduces a plug-in that transforms QF query into another QF query forcing the system to process new set of operations, including the operations implemented in this plug-in component. In this approach, the system uses an explicit plug-in operation specification. At the QFW consumer side, one can interject a provider query into the query definition sent to the QFW service. It explicitly requires the system to invoke an appropriate plug-in at the explicitly specified point of query execution. The second approach needs some level of the query definition extension at the client side.

As an example of the first approach, the "add-on filter" plug-in is described. This plug-in adds extra filtering conditions to all tables involved in a request received by QFW. The filter depends on the properties of a user or properties of the environment. This functionality effectively allows to provide some additional data access limitations for a given user. The "add-on filter" plug-in can be inserted into the system 10 transparently to the client application, thus, it does not impact main semantics of the query, but rather provides extra data access regulation. This plug-in may be introduced into the system 10 as follows. The plug-in fits the category of transformation providers. It is invoked before the query reached planner providers and, on the other hand, when all tables participating in the request are identified, i.e., it happens after query refinement process took place, so that a reference to the involved tables is defined explicitly in the request. The transformation replaces a table reference with a macro operation of top of every table reference and containing the required extra filtering condition.

The query framework system 10 may also accommodate a disclosure avoidance plug-in. The agencies publishing statistical data have the problem of disclosure avoidance, i.e. the requirement that the published data will not allow to derive confidential information about individual items (for example companies) participating in the statistics. The disclosure avoidance plug-in responsible for prevention of disclosure uses information on query subjects involved in the query, and logical presentation of the operations applied to the data coming out of these query subjects. It applies post-processing operation to the data stream being result of the query.

The query framework system 10 invokes the disclosure avoidance pluggable component after the query refinement provider 144 and before the query decomposition provider 146. The disclosure avoidance component uses the refined state of the QF query, so that the logical representation of all operations involved in the query is available.

The disclosure avoidance component declares all operations to be supported: <allOperations supported="true"/>. Thus, the whole QF query is passed down to this component for analysis. The result of the disclosure analysis planning exercise is a provider query definition interjected to the top of QF query representing the post-processing operation applied to the outgoing data stream.

CONCLUSION

The described method of query processing in the query framework system 10 allows for flexibility for query interception, interpretation, and transformation. It also facilitates the reuse of the functionality of components already available in the system 10.

The described method of query processing in the system of loosely coupled components is applicable to query languages that allow representing a request as a tree of macro operations. A query language is extended with a concept of a provider query representing a planned, ready for execution version of a macro operation associated with a given system component, called provider. The coordination planner governs the query processing logic spread across all providers. The query processing is broken in query preparation and query execution phases. Replacing macro operations with provider queries is the essence the query preparation. Every provider invoked by the coordination planner in a configurable sequence contributes to that transformation. The end result of query preparation, the execution plan, is a tree of provider queries that is traversed by the coordination planner during execution phase. The coordination planner invokes a provider corresponding to a provider query and passes its result to the higher level operation. The result of the root operation is a final result of a request.

The coordination planner and the query framework system of the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

The present invention has been described with regard to one or more embodiments. However, it will be apparent to persons skilled in the art that a number of variations and modifications can be made without departing from the scope of the invention as defined in the claims.

What is claimed is:

1. A query processing coordination planner for coordinating query processing in a query framework system, the query processing coordination planner comprising:
   one or more processors configured to execute:
   a query converter, which, when executed on the one or more processors, is configured for:
      receiving a user request for data from one or more data sources, and converting the user request into a logical representation using a query language specification of the query framework system, wherein the query converter (i) converts the user request into the logical representation that expresses the user request as a tree of blocks such that results of a child query block feeds the operation of a corresponding parent query block, and (ii) the query converter associates query blocks with an identifier that is unique within the user request;

the query framework system having query operation providers, wherein each query operation provider performs a specific query operation for executing a corresponding provider query, the query language specification being used commonly by the query operation providers;

a request preparation coordinator, which, when executed on the one or more processors, is configured for:

preparing the user request for execution by translating the logical representation of the user request into a physical representation of the user request;

using the query operation providers to generate one or more provider queries, and replacing the one or more provider queries in place of the corresponding parts of the logical representation of the user request, each provider query being executable by an associated query operation provider; and a request execution coordinator which, when executed on the one or more processors, is configured for:

executing the one or more provider queries, by the corresponding query providers, to obtain a result data stream using the query operation providers associated with the one or more provider queries.

2. The query processing coordination planner as recited in claim 1, wherein the coordination planner interacts with query operation providers to prepare the user request by translating individual query blocks into one or more provider queries, generates an execution plan based on the one or more provider queries, and executes the one or more provider queries in accordance with the execution plan.

3. The query processing coordination planner as claimed in claim 2, wherein the coordination planner causes the query operation providers to insert the one or more provider queries in the user request, and/or the query operation providers to specify the one or more provider queries in place of one or more SELECT blocks when the user request is in a Structured Query Language (SQL).

4. The query processing coordination planner as recited in claim 2, wherein the coordination planner traverses the execution plan from leaf provider queries to a root provider query.

5. A query processing coordination planner for coordinating query processing to obtain requested data from one or more data sources, the query processing coordination planner comprising:

one or more processors;

a query converter which, when executing on the one or more processors is configured for:

receiving a user request for data from one or more data sources, wherein the query converter converts the user request into a converted query that expresses the user request conceptually as a tree of query blocks such that results of child query blocks feed the operation of their parent query block, and associates relevant query blocks with an identifier that is unique within the user request, and converting the converted query into a logical representation using a query language specification of a query framework system, the query framework system having query operation providers, wherein each query operation provider performs a specific query operation for executing a corresponding provider query, the query language specification being used commonly by the query operation providers; and a request execution coordinator which, when executing on the one or more processors is configured for executing one or more provider queries in accordance with an execution plan using the query operation providers associated with the one or more provider queries.

6. The query processing coordinator planner as recited in claim 5, wherein the request preparation coordinator comprises:

a sequence manager managing invocation of the query operation providers;

a provider request extractor extracting one or more query parts of the logical representation of the user request that are supported by one or more query operation providers for having the extended query parts translated to one or more prepared query parts by the query operation providers that support the extracted query parts; and a provider response incorporator receiving the prepared query parts; and incorporating the prepared query parts into the execution plan.

7. The query processing coordination planner as recited in claim 6, wherein the request preparation coordinator further comprises;

an operation support table service unit providing information from an operation support table which describes supported functionality of the query operation providers; and wherein the provider request extractor extracts the query parts using the information provided by the operation support table service unit.

8. The query processing coordination planner as recited in claim 6, wherein the provider response incorporator incorporates the prepared query parts back into the logical representation of the user request to generate one or more provider queries, each provider query being generated for an associated query operation provider and including associated prepared parts of the user query such that the associated provider query is capable of executing the provider query.

9. The query processing coordination planner as recited in claim 8, wherein the request execution coordinator comprises:

an execution plan walker traversing the execution plan for having relevant query operation providers invoked to execute the associated provider queries; and a data stream manager collecting one or more provider data streams from each of the query operation providers that executes the associated provider queries, and generating a result data stream based on the provider data streams.

10. The query processing coordination planner as recited in claim 9, wherein the execution plan walker traverses the execution plan from leaf provider queries to a root provider query.

11. The query processing coordination planner as recited in claim 5 further comprising a component invocator invocating the query operation providers in accordance with the request preparation coordinator and the request execution coordinator.

12. The query processing coordination planner as recited in claim 5 further comprising a message consolidator handling messages from the query operation providers.

* * * * *